Dec. 12, 1933.            G. W. McKEE                1,938,851
                            BURNER
                      Filed Feb. 12, 1930
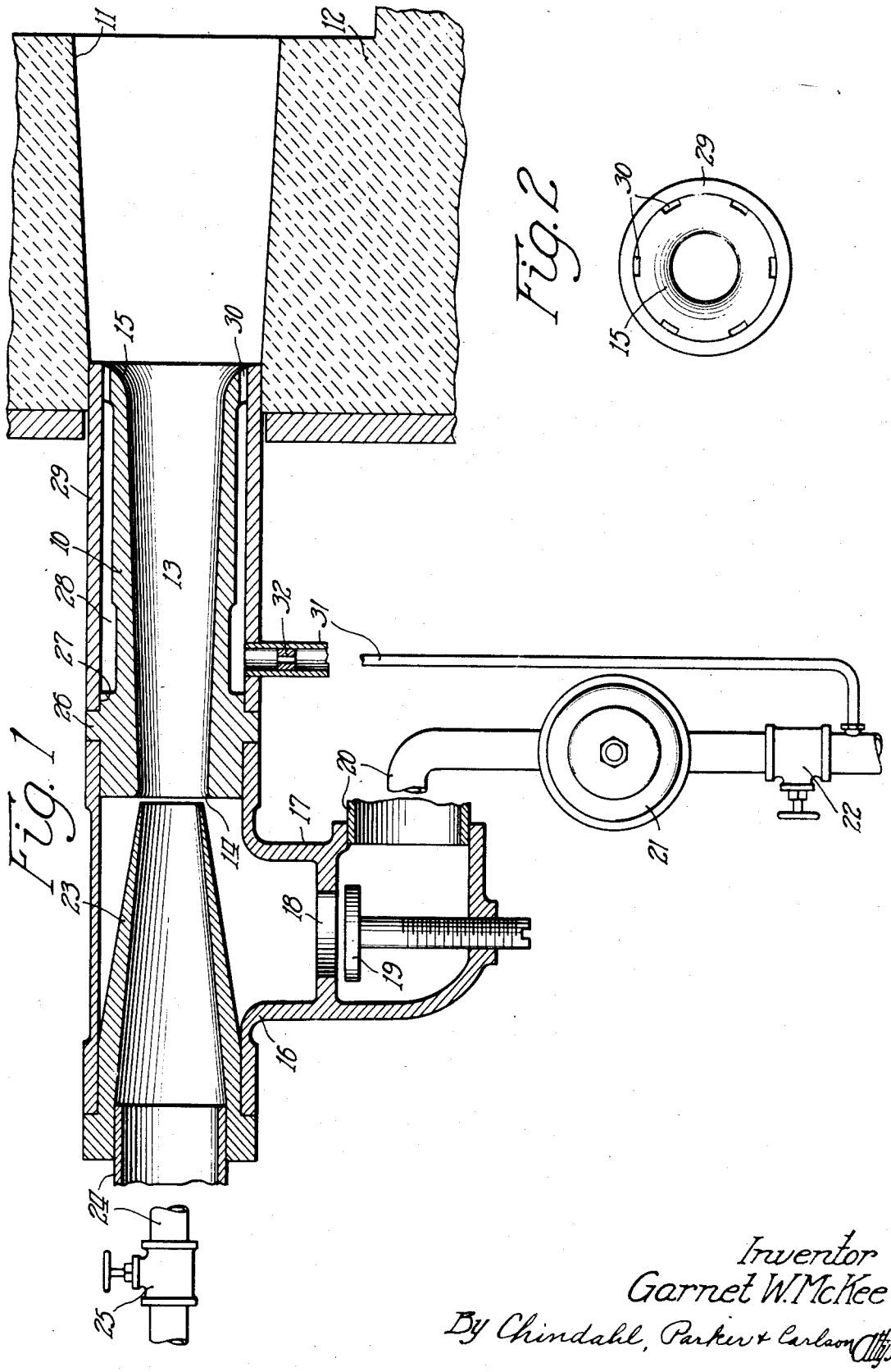
Inventor
Garnet W. McKee
By Chindahl, Parker & Carlson Attys Patented Dec. 12, 1933

1,938,851

UNITED STATES PATENT OFFICE 1,938,851

BURNER

Garnet W. McKee, Rockford, Ill.

Application February 12, 1930. Serial No. 427,713

12 Claims. (Cl. 158—109)

The present invention relates to improvements in burners, and has particular reference to burners adapted for use with means for producing and supplying an adjustable proportionate mixture of fuel gas and air, such for example as a jet inspirator.

Jet inspirators commonly comprise a mixing tube, a chamber communicating with the inlet end of the tube and adapted to be supplied with one of the fluid constituents of the fuel mixture, for example fuel gas, and a nozzle for discharging a jet of the other fluid constituent of the fuel mixture, for example air, as the driving fluid, into the tube to induce a proportionate flow of fluid from the chamber into the tube.

The mixing tube may be connected to the burner. The induced fluid is supplied at a constant pressure, usually zero gauge pressure, through the agency of a governor in the supply line. An adjustable orifice interposed in this line between the inspirator and the governor serves as a means for adjusting the air and fuel gas ratio in the fuel mixture. The volume of fuel mixture supplied to the burner is adjustable through the agency of a control valve in the supply line to the nozzle. For any given setting of the orifice, the air and fuel gas ratio will remain substantially constant over a limited range of adjustment of the volume of fuel mixture supplied.

A burner of this construction is of the single valve control type. That is to say, assuming that air is the driving fluid and fuel gas is the induced gas at zero gauge pressure, and for any adjusted proportion of air and gas, adjustment of the supply of air to the nozzle effects a corresponding adjustment in the volume of fuel mixture supplied without change in the established air-gas ratio.

Heretofore, the range of adjustment has been limited, and has not permitted any substantial turn down from full capacity. Volume varies as the square root of the pressure $(V = \sqrt{P})$. Thus, to obtain a turn down of 10 to 1 necessitates a reduction in pressure of 100 to 1. At very low inducing pressures, for example, pressures measured in a few hundredths of an inch of water column, the zero governor in the gas line is unreliable and does not function accurately, and may even close entirely. Under these conditions, the gas will be supplied, if at all, in pockets, the mixture will be improper, and the burner will be subject to coughing, back-firing and going out.

One of the important objects of the present invention is to provide a new and improved burner of the foregoing type which has an unusually wide range of turn down, for example, as low as 3 per cent. of its maximum capacity, without objectionable operating characteristics. This is particularly desirable in burners for large boilers.

A more specific object is to provide a novel burner having means for conducting a small pilot stream of gas to the burner tip which gas is available to combine with the air flowing through the burner during turn down operation, and which also serves to keep the burner ignited if abnormal stack back pressure or any other cause should extinguish the main flame.

Another object is to provide a novel burner which constitutes a part of the mixer and which is so close to the furnace tuyère that the mixture of air and fuel although present in the desired proportion is not mixed intimately or completely and hence is not so likely to result in back-firing as would a more perfect mixture.

Further objects and advantages will become apparent as the description proceeds.

In the drawing, Figure 1 is a view, partially in section of a burner embodying the features of my invention.

Fig. 2 is an end view of the burner tube.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the burner in the preferred form comprises a burner tube 10 of suitable form mounted at its discharge end in a suitable tuyère hole 11 in a furnace wall 12. In the present instance, the tube 10 is elongated, and has a gradually tapering mixing chamber 13 with an entrance cone 14 at the small end and a rounded outwardly flaring cone 15 at the discharge end. The hole 11 constitutes a slightly flaring chamber in effect a continuation of the chamber 13.

Connected to the inlet end of the burner tube 10 is a casing 16 preferably in the form of a suction T and having a fuel gas inlet 17. An orifice 18 controlled by a hand adjustable valve 19 is provided in the inlet 17 to control the supply of gas thereto. Connected to the inlet 17 is a gas line 20 leading from a suitable source (not shown). Interposed in the line 20 are a suitable zero governor 21 and a hand valve 22 at the inlet side of the governor. The specific construction of the governor per se forms no part of the invention, and hence is not disclosed herein. The governor is provided to take gas from the line 20 and to supply the gas to the casing 16 at a substantially constant pressure, usually zero gauge, without regard to the line pressure or fluctuations therein. It will be evident that one governor may serve any desired number of burners.

Mounted in the casing 16 and in alinement with the tube 10 is an air nozzle or jet 23. This jet extends through the casing 16 and across the gas inlet 17 closely to and centrally of the inlet cone 14. The outer end of the jet 23 is connected to an air line 24 leading from a suitable source (not shown). Interposed in the line 24 is a hand valve 25 for regulating the supply of air to the jet 23.

Air discharged from the jet 23 at a predetermined pressure into the tube 10 will induce a proportionate flow of gas. The proportion is dependent on the position of the valve 19, and is subject to variation through adjustment thereof. The volume of the air-fuel mixture may be varied by adjusting the air control valve 25. Under low turn down conditions, very low pressures will prevail in the casing 16 with the result that the gas will be supplied unevenly, and at times may not be supplied at all due to closing of the governor.

Means is provided for supplying gas to the tip of the burner 10 to mix with the air under low turn down conditions, and to provide a pilot flame for keeping the burner ignited at all times. To this end, the burner tube 10 is formed adjacent its outer end with an outer peripheral flange 26 defining an annular shoulder 27, and is formed intermediate the shoulder and the tip with a peripheral recess 28.

An outer sleeve 29 is fitted snugly over the tube 10 and against the shoulder 27, and preferably is welded to the latter. The tube 10 and the sleeve 29 by reason of the recess 28 define a closed annular space. Formed in the outer periphery of the burner tip in spaced relation are a plurality of longitudinal pilot ports 30 which are adapted to discharge gas from the space 28 to the outer zone of the air or fuel mixture leaving the burner tube 10. The end of the sleeve 29 adjacent the discharge ports 30 defines a flat annular surface into which the flared end 15 of the passage 13 converges.

A small pilot line 31 is connected to the line 20 in front of the governor 21, and opens through the sleeve 29 to the space 28. A suitable orifice 32 is interposed in the line 31.

The line 31 thus serves to supply a small amount of gas to the ports 30 from where it is discharged at a low pressure and independently of the governor. This supplemental supply of gas compensates for unreliability of the governor by insuring a small amount of gas at all times, and thus preventing coughing, back-firing, extinguishing of the flame, etc. The pilot gas jets by reason of their disposition along the outer wall of the path of the fuel mixture assist in effecting a more intimate mixture of air and gas in the tuyère hole 11.

The burner tube 10 constitutes part of the mixer, and since it is positioned in close proximity to the furnace tuyère or burner well 11, the stream of air and fuel discharged therefrom is not mixed intimately or completely. Hence back-firing is not so likely to occur as it would if a more perfect mixture were discharged. The curved end cone 15 and the tuyère 11 serve to effect a more perfect mixture of the air and fuel after leaving the tube 10.

I claim as my invention:

1. A burner comprising, in combination, a wall having a tuyère hole, a burner tube having a longitudinal passage opening therethrough, said passage tapering gradually and having an inlet cone at the small end and a discharge cone at the large end, a sleeve fitting about said tube and defining an annular space therewith, a plurality of spaced ports opening from said space through the tip of said tube to said hole, a suction T connected to the inlet end of said tube, a nozzle extending through said T substantially to said inlet cone and in axial alinement therewith, valve controlled means for supplying a driving gas to said nozzle, a line for supplying an induced gas to said T, a zero governor in said last mentioned line, an adjustable orifice in said last mentioned line at the outlet side of said governor, and a restricted line connecting said last mentioned line at the inlet side of said governor to said space.

2. A burner comprising, in combination, a wall having a tuyère hole, a burner tube having a longitudinal passage opening therethrough, said passage tapering gradually and having an inlet cone at the small end and a discharge cone at the large end, the exterior of said tube being recessed peripherally with a shoulder at the discharge tip, a sleeve fitting about the recessed portion of said burner tube and defining a closed annular space therewith, a plurality of peripherally spaced ports formed in said shoulder and opening from said space to said hole, a suction T connected to the inlet end of said tube, a nozzle extending through said T and discharging into said inlet cone, valve controlled means for supplying a driving gas to said nozzle, a line for supplying an induced gas to said T, a governor in said last mentioned line, an adjustable orifice in said last mentioned line at the outlet side of said governor, and a line connecting said last mentioned line at the inlet side of said governor to said space.

3. A burner comprising, in combination, a wall having a tuyère hole, a burner tube having a longitudinal passage opening therethrough and discharging to said hole, a chamber surrounding said tube, a plurality of spaced ports in excess of two formed in the tip of said tube and opening from said chamber in uniformly closely peripherally spaced relation to said hole, a suction chamber connected to the inlet end of said tube, a nozzle adapted to discharge to the inlet end of said tube, means for supplying a driving gas to said nozzle, means for supplying an induced gas to said suction chamber, the gas from one of said means being air and the gas from the other of said means being fuel, and means for supplying a small stream of fuel from said other means to said first mentioned chamber.

4. A burner comprising, in combination, a wall having a tuyère hole, a burner tube having a longitudinal passage opening therethrough, a sleeve fitting about said burner tube and defining an annular space therewith, a port formed in the tip of said tube and opening from said space to said hole, a suction chamber connected to the inlet end of said tube, a nozzle extending through said chamber substantially to the inlet end of said tube and in axial alinement therewith, valve controlled means for supplying a driving gas to said nozzle, a line for supplying an induced gas to said chamber, a governor in said last mentioned line, an adjustable orifice in said last mentioned line at the outlet side of said governor, and means for supplying a substantially constant stream of fuel to said space.

5. A burner comprising, in combination, a burner tube formed with spaced outer peripheral flanges, one flange being located at the discharge tip, a sleeve on said tube and defining a closed space between said flanges, a plurality of ports opening from said space through said last mentioned flange, means for supplying a fuel mixture to said tube, and means for supplying fuel to said space.

6. A burner comprising, in combination, a burner tube having an outer peripheral flange on its discharge end, a plurality of uniformly peripherally spaced notches formed in the periphery of and opening through said flange, a sleeve on said tube and defining an annular space therewith, said sleeve fitting over said flange, means for supplying a fuel mixture to said tube, and means for supplying fuel to said space.

7. A burner comprising, in combination, a burner tube having a longitudinal passage opening therethrough, the discharge end of said passage being flared outwardly, a plurality of peripherally spaced supplemental passages opening through the flared surface of said first mentioned passage at the tip of the discharge end of said tube, means for supplying a primary fuel mixture to said tube, and means for supplying fuel to said supplemental passages.

8. A burner comprising, in combination, a wall having a tuyère hole, a tube having a longitudinal passage opening therethrough, a sleeve fitting about said tube and defining an annular space therewith, a plurality of spaced ports opening from said space to said hole, a suction T connected to the inlet end of said tube, a nozzle extending into said T substantially in axial alinement with said passage, means for supplying air under pressure to said nozzle, means for supplying a fuel gas to said T, and means branching from said last mentioned means for supplying fuel gas to said space.

9. A burner comprising, in combination, a wall having a tuyère hole, a tube having a longitudinal passage opening therethrough, said passage tapering gradually, a sleeve fitting about said tube and defining an annular space therewith, a plurality of spaced ports opening from said space to said hole, a suction T connected to the inlet end of said tube, a nozzle extending into said T substantially in axial alinement with said passage, means for supplying a driving gas to said nozzle, means for supplying an induced gas to said T, said gases to form an air-fuel mixture, and means for supplying fuel to said space.

10. A burner comprising, in combination, a wall having a tuyère hole, a burner tube having a longitudinal passage opening therethrough, means defining an annular space about said tube, a plurality of spaced ports opening from said space at the discharge end of said tube to said hole, a suction T connected to the inlet end of said tube, a nozzle extending into said T substantially in axial alinement with said passage, means for supplying air under pressure to said nozzle, a line for supplying induced fuel gas to said T, a pressure governor in said line, an adjustable orifice in said line between said governor and said T, and a branch line connecting said first mentioned line to said space.

11. A burner comprising, in combination, a burner tube having a straight longitudinal passage opening therethrough, the outlet end of said passage being flared outwardly on a radius, a sleeve fitting about said tube and defining an annular space therewith, the end of said sleeve defining a flat annular surface about the flared outlet end of said passage, a plurality of peripherally spaced ports opening from said space to said surface about the discharge end of said tube, means for supplying a mixture of fuel and air under a high pressure to said tube, and means for supplying fuel to said space.

12. A burner comprising, in combination, a body having an elongated passage opening therethrough and having a peripheral space out of direct communication with said passage, the outer end of said passage being flared, said body being formed with a flat annular end surface concentric about and merging with said flared end of said passage and being formed with a plurality of peripherally spaced ports opening from said space to said surface, means for supplying a mixture of fuel and air under pressure to said passage, and means for supplying fuel to said space.

GARNET W. McKEE.